Nov. 15, 1960
C. D. LOVELACE
2,960,246
BOAT TRAILER
Filed Dec. 3, 1957
2 Sheets-Sheet 1
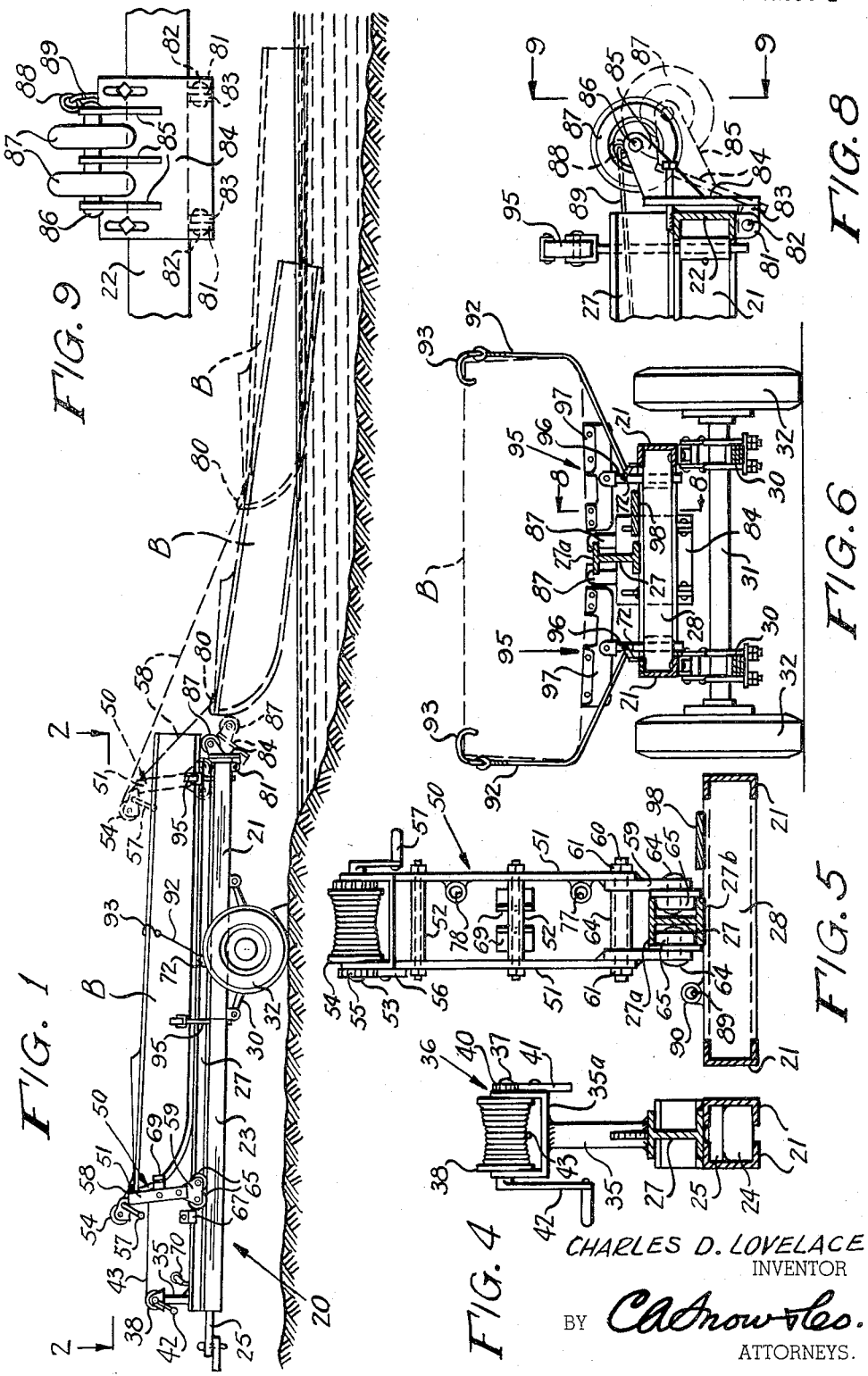
CHARLES D. LOVELACE
INVENTOR
BY CA Snow &Co.
ATTORNEYS.

Nov. 15, 1960 C. D. LOVELACE 2,960,246
BOAT TRAILER
Filed Dec. 3, 1957 2 Sheets-Sheet 2
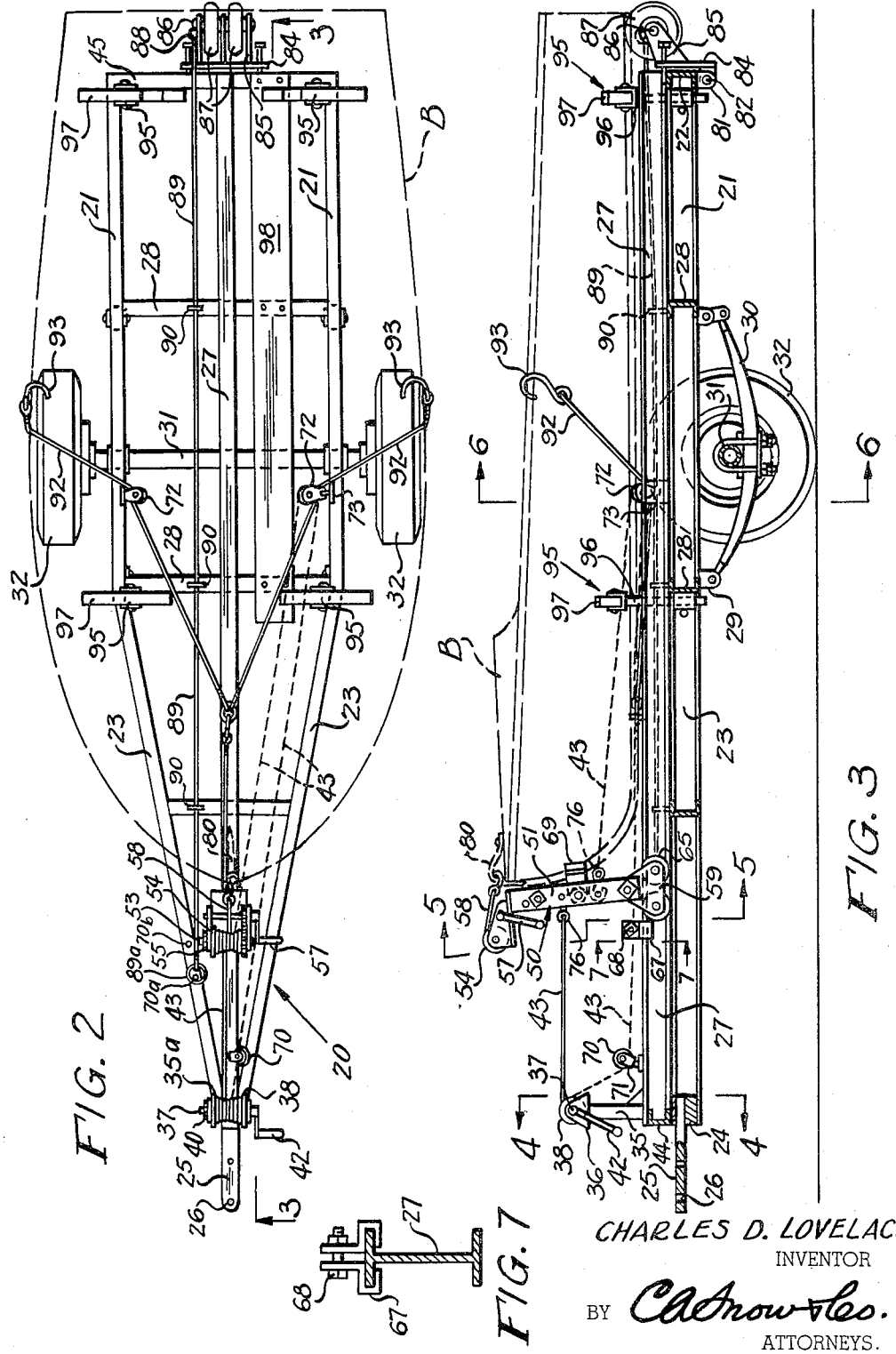
CHARLES D. LOVELACE
INVENTOR
BY *Cathrow & Leo.*
ATTORNEYS.

2,960,246
BOAT TRAILER
Charles D. Lovelace, Box 67, Bandera, Tex.

Filed Dec. 3, 1957, Ser. No. 700,419

1 Claim. (Cl. 214—84)

This invention relates to a boat trailer, and has particular applicability to that type of boat trailer adapted for carrying a small boat in position to be towed by a vehicle.

A primary object of this invention is the provision of an improved boat trailer having means whereby a boat may be loaded and unloaded directly into or out of the water with a minimum of effort and difficulty.

An additional object of this invention is the provision of an improved boat trailer characterized by means whereby boats of various lengths may be readily carried on the same trailer.

A further object of the invention is the provision of a trailer of this nature provided with winch means as a component part thereof for loading and unloading the boat, and additional winch means for raising the bow of the boat during the loading operation to a point from which it may be drawn directly onto the trailer.

A further object of the invention is the provision of a trailer of this nature provided with rubber tire loading wheels, adapted to embrace the keel of such a boat, whereby marring of the finish or structure of the boat during loading or unloading is obviated.

An additional object of the invention is the provision of a trailer of this nature upon which the boat may be readily loaded, and, after loading, securely held thereon in such position and arrangement as to avoid dislodgement or movement thereof during transit.

Still another object of the invention is the provision of a boat trailer of this character which is sturdy and durable in construction, reliable and efficient in operation, and relatively simple and inexpensive to manufacture, assemble and utilize.

Still other objects reside in the combinations of elements, arrangements of parts, and features of construction, all as will be more fully pointed out hereinafter and shown in the accompanying drawings wherein there is disclosed a preferred embodiment of this inventive concept.

In the drawings:

Figure 1 is a side elevational view of the trailer of the instant invention, having a boat loaded thereon, the boat being indicated in dotted lines as partially and completely unloaded.

Fig. 2 is a top plan view of the trailer of the instant invention on an enlarged scale, the position of the boat being indicated in dotted lines.

Fig. 3 is a sectional view taken substantially along the line 3—3 of Fig. 2 as viewed in the direction indicated by the arrows.

Fig. 4 is a sectional view taken substantially along the line 4—4 of Fig. 3 as viewed in the direction indicated by the arrows.

Fig. 5 is a sectional view taken substantially along the line 5—5 of Fig. 3 as viewed in the direction indicated by the arrows.

Fig. 6 is a sectional view taken substantially along the line 6—6 of Fig. 3 as viewed in the direction indicated by the arrows.

Fig. 7 is an enlarged fragmentary detail sectional view taken substantially along the line 7—7 of Fig. 3 as viewed in the direction indicated by the arrows.

Fig. 8 is an enlarged fragmentary detail view partially in section, taken substantially along the line 8—8 of Fig. 6 as viewed in the direction indicated by the arrows, a different position of adjustment being indicated in dotted lines, and Fig. 9 is an end elevational view of the construction of Fig. 8 taken substantially along the line 9—9 of Fig. 8 as viewed in the direction indicated by the arrows.

Similar reference characters refer to similar parts throughout the several views of the drawing.

Referring to the drawings in detail, the boat trailer of the instance invention comprises a frame, generally indicated at 20, including parallel outer side bars 21, which may be comprised of channel beams, and which are connected at their rear ends by a cross member 22. The side bars 21 converge inwardly toward the front of the trailer, as indicated at 23, and are connected at their forward ends by a cross member 24. A draw bar 25 provided with suitable apertures 26 for the engagement of the tow hook extending from the towing vehicle, extends forwardly between the converging ends of members 23.

A longitudinally extending I beam 27 extends the full length of the trailer, and is supported intermediate its length on cross beams 28 carried by side bars 21. Spaced lugs 29 depend from bars 21 and support the ends of leaf springs 30, which in turn carry a conventional axle 31 which carries rubber tired wheels 32. The forward ends of members 23 carry a fixed upright 35, topped by a fork 35a between the upper ends of which extend a winch, generally indicated at 36, which comprises an axle 37 upon which is mounted a V drum 38. A suitable ratchet 40 is secured to axle 37 adjacent to one end of fork 35a and the adjacent end of drum 38, and the movement of ratchet 40 is controlled by a releasable pawl 41. The winch also includes a manual crank 42 secured to one end of axle 37. which is employed for the reeling and unreeling of a cable 43 wound on winch 36, for a purpose to be more fully described hereinafter.

A transverse supporting bar 44 mounted between ends 23 carries the forward end of I beam 27, while the rear end thereof is secured to a supporting plate 45 extending transversely across the rear end of the trailer, and superposed on cross member 22 between side bars 21.

A movable upright generally indicated at 50 is mounted on I beam 27 for longitudinal movement, and comprises a pair of upright side bars 51, connected at suitable intermediate points by reinforcing cross bars 52. The upper end of upright 50 carries an axle 53, upon which is mounted a winch drum 54, provided with a ratchet 55 and pawl 56, the drum being rotatable by a crank handle 57, and the arrangement being substantially identical to that of the winch assembly 36 previously described. A cable 58 is wound upon drum 54, for a purpose to be more fully described hereinafter.

The lower portions of uprights 51 have positioned therebetween a pair of triangular plates 59, which are connected to the uprights 51 by means of a bolt 60 and lock nut 61, a spacer tube 60a being mounted on bolt 60 between the upright flanges of triangular plates 59 for the purposes of spacing the members 59, and also to preclude tilting of the uprights 51. The triangular plates 59 carry stub shafts 64, upon which are mounted rollers 65, the diameter of the rollers 65 being substantially equal to that of the spacing between the upper and lower flanges respectively 27a and 27b of I beam 27, in such a manner that the uprights and their associated elements will ride along the I beam 27, it being noted that the I beam 27 inclines rearwardly from its front support 24 to its rear support 45. A stop member 67 is mounted on I beam 27 at a point adjacent the upright 35, an adjustable mounting being provided by means of a bolt and nut 68, so that the stop may be shifted along the I beam to limit the forward travel of a boat carried by the trailer. A V-shaped boat stop member 69 is also suitably supported between uprights 51.

Referring now back to cable 43, the same is extended from winch drum 38 to a pulley 70 carried by a supporting bracket 71 fixed to one of the side members 23, and thence extends rearwardly about a pulley 72 located adjacent the rearmost of supports 28, and carried on a clevis 73. The cable 43 is then extended forwardly to engage, as best shown in Fig. 3, a hook 76 which releasably engages an eye 77 carried by one of uprights 51. It will thus be seen that when the cable 43 is so arranged, the upright 50 may be moved rearwardly of I beam 27, to move the boat, generally indicated at B, rearwardly of the trailer frame. One of the uprights 50 also carries adjacent its upper end a second eye 78, to which the hook 76 may be alternatively attached, after the cable 43 is disengaged from pulleys 70 and 72, and the eye 77, which action may take place when the upright 50 is even with the rearmost of cross supports 28 which carries the pulley 72, at which time a direct pull may be exerted on the uprights 50 to retard the rearward movement of uprights 50, and consequently the boat B. The cable 58 extending from drum 54 is adapted to engage a suitable eye 80 secured to the bow of the boat, and is adapted to raise the bow of the boat from the water, or lower the same, after the boat has been moved to the rear of the trailer, all as will be more fully described hereinafter.

The rear cross member 22 of the frame has depending therefrom a pair of spaced apart lugs 81, to which ears 83 extending from a plate 84, are pivotally connected, as by means of bolts 82. The plate 84 carries brackets 85 extending laterally therefrom, said brackets having openings in which a shaft 86 is mounted on which rubber rollers or wheels 87 operate.

One of said brackets 85 carries at one side thereof an eye 88 from which extends a cable or cord 89 which carries a ring 89a, which engages a pin 70a in one position of adjustment. A second pin 70b is also mounted on the same side frame member 23 for engagement by ring 89a in another position of adjustment. By means of the cable 89 the plate 84 and its associated wheels 87 may be pivoted about pivot bolts 82 to the full line position shown in Figs. 1, 3 and 8, for example, or dropped alternatively to the dotted line position of Figs. 1 and 8, or positioned at any suitable angle in between. The purpose of this positioning of the roller will also be pointed out hereinafter.

Boat rests 95 are also provided at suitable points along the length of the frame 20, and comprise uprights 96 upon which are pivotally mounted transversely extending supporting plates 97, which support the sides of the boat when in loaded position.

A plank or walkway 98 is also provided extending from the foremost of transverse members 28 to the rear support 45.

From the foregoing the operation of the device should now be readily understandable. When the boat is fully loaded, as indicated in full lines in Fig. 1, and in dotted lines in Fig. 3, the bow is adjacent the upright 50, preferably resting against the bow brace or support 69, with the sides of the boat resting on the supports 95, these supports being spaced apart on opposite sides of the keel, so that the keel itself may rest on the top flange 27a of the I beam 27. When in this position and lashed down, as by means of tie down cords 92 terminating in hooks 93, the boat and trailer are ready for transport, it being noted that at this time the wheels 87 are swung to their downward position, either fully or in part, as desired, in order to be out of engagement with the keel of the boat B. It is to be noted that the tie down cords 92 pass around pulleys 72 mounted on the inner sides of side members 21 and may, if desired, be connected at a common point to cable 58 for tightening by winch 54. When it is desired to lower the boat into a body of water, the trailer is backed as closely as possible to the shore line, in the position, for example, of Fig. 1, or extending out over the body of water, and the wheels 87 raised, by the cable 89, to contact the keel of the boat, and lift the same free from the supports 97. The winch 38 is then actuated, by the release of the pawl 41 from ratchet 40, and by exerting pull on the lower strand of cable 43, the boat is moved rearwardly of the trailer, until such time as its bow is adjacent the pulley 72, this being effected by movement of upright 50 toward the rear of the trailer, and the pushing effect exerted by the bow support or brace 69 against the bow of the boat. At this time the inclination of member 27, and the fact that the center of the boat is closely adjacent the rollers or wheels 87, the cable 43 is disconnected from the eye 77 at the front of the boat, and its associated pulley 72, and the hook 76 reconnected to the eye 78. At this time gravity takes over, and the boat continues to move rearwardly over the rollers 87, until such time as the uprights 50 are in their rearmost position, as shown in dotted lines in Fig. 1, with the bow of the boat supported by cable 58 against the rollers 87. The pawl 41 is reengaged with the ratchet 40, to preclude further rearward movements of the boat, and the cable 58 is extended by means of handle 57 and drum 54, to lower the bow of the boat into the water, at which time the boat may float free. When the cable 58 is disconnected from the eye 80 it will be apparent that the boat is in free floating position and ready to sail. At the time the bow of the boat is lowered by means of the cable 58, the rollers 87 may also be lowered by means of cable 89 to permit clearance of the bow of the boat from the rear of the trailer.

When it is desired to raise the bow of the boat from the water, the cable 58 is reconnected to the eye 80, and wound by means of the drum 54 and its associated operating handle 57 to a position where the bow of the boat is level with the rear of the trailer. At this time the rollers 87 may be moved into the full line position of Fig. 3, to engage under the keel of the boat, which rides thereover, when the upright 50 is moved rearwardly, by engagement of the cable 43 with the eye 77. Rotation of the operating handle 42 will then cause rotation of the winch assembly 36 to move the uprights 50 forwardly and load the boat into moving or towing position.

Then the boat is fully drawn onto the trailer, and the winch drums are locked by means of their associated pawls, and the wheels 87 are lowered to permit the keel of the boat to engage rests or supports 97, and the boat relashed for towing.

From the foregoing it will be seen that there is herein provided an improved boat trailer, which accomplishes all of the objects of this invention, and others, including many advantages of great practical utility, and commercial importance.

As various embodiments may be made of this inventive concept, and as various modifications may be made in the embodiment hereinbefore shown and described, in is to be understood that all matter herein is to be interpreted merely as illustrative, and not in a limiting sense.

I claim:

In a boat trailer, in combination a wheeled frame including spaced parallel side bars, cross beams connecting said parallel side bars, an I beam extending longitudinally of the axis of said frame, connected to said cross beams, the open sides of said I beam being disposed towards the sides of said frame presenting upper and lower laterally extended tracks, a movable upright member including spaced vertical side bars, mounted on said I beam, a pair of triangular plates connected to said side bars of said movable upright member, stub shafts extending inwardly from the triangular plates, rollers of diameters to fit between the flanges at opposite sides of said I beam in contact with said upper and lower tracks, a winch carried by said movable upright, cable means connected between said winch and bow of the boat for moving said boat onto said trailer frame, a plate extending rearwardly from the frame and hinged at its lower end to the rear end of said frame, a pair of spaced rollers mounted on said plate adapted to contact a boat at opposite sides of the keel of said boat, and said plate adapted to swing downwardly, the rollers mounted on said plate moving to positions below the side rails of the frame adapted to guide a boat onto the frame.

References Cited in the file of this patent

UNITED STATES PATENTS

| | | |
|---|---|---|
| 428,551 | Carter | May 20, 1890 |
| 1,745,045 | Romine | Jan. 28, 1930 |
| 2,424,899 | Priester | July 29, 1947 |
| 2,496,599 | Rivers | Feb. 7, 1950 |
| 2,586,485 | Schroeder | Feb. 19, 1952 |
| 2,746,622 | Roy | May 22, 1956 |
| 2,763,384 | Foster | Sept. 18, 1956 |
| 2,777,588 | Williams | Jan. 15, 1957 |
| 2,809,496 | Geil | Oct. 15, 1957 |